June 12, 1956 — C. PASQUETTI — 2,749,571
MACHINE FOR MIXING AND EXTRUDING
Filed Jan. 18, 1952 — 6 Sheets-Sheet 1

INVENTOR
CARLO PASQUETTI
BY
ATTORNEY

June 12, 1956  C. PASQUETTI  2,749,571
MACHINE FOR MIXING AND EXTRUDING
Filed Jan. 18, 1952  6 Sheets-Sheet 2

INVENTOR
CARLO PASQUETTI
BY
ATTORNEY

INVENTOR
CARLO PASQUETTI
BY
ATTORNEY

June 12, 1956 C. PASQUETTI 2,749,571
MACHINE FOR MIXING AND EXTRUDING
Filed Jan. 18, 1952 6 Sheets-Sheet 5
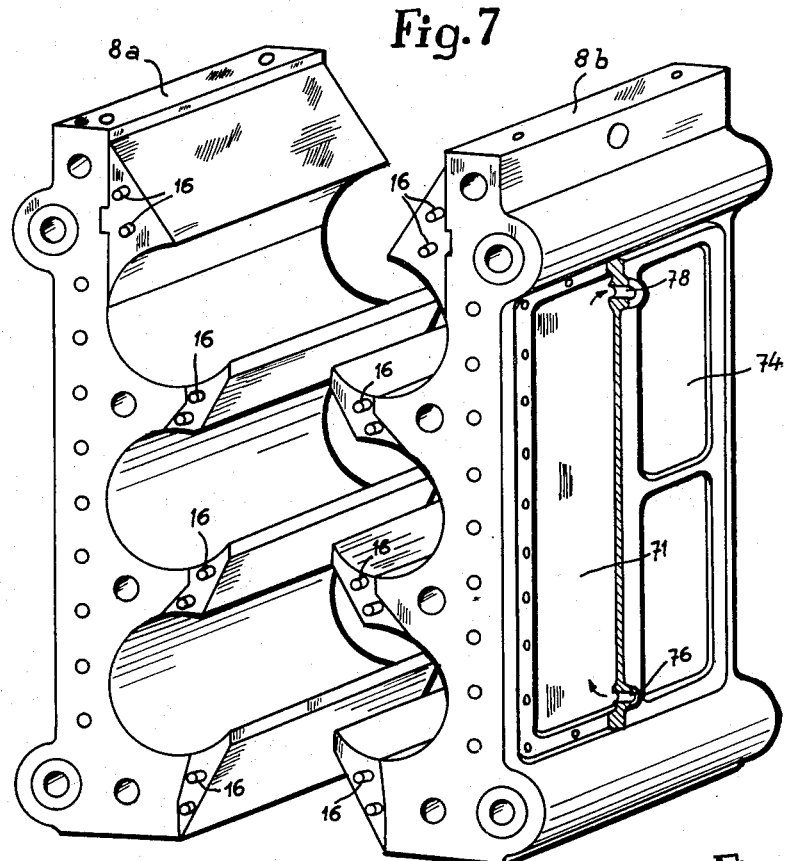
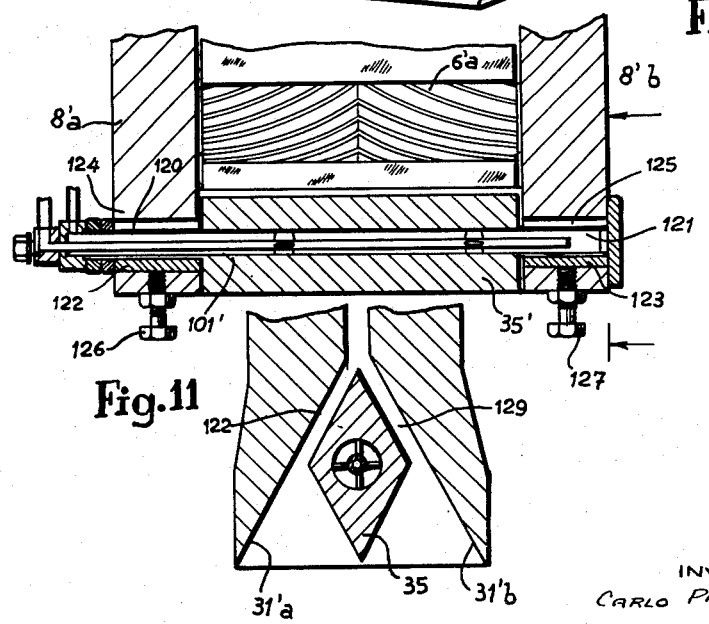
INVENTOR
CARLO PASQUETTI
BY
ATTORNEY June 12, 1956  C. PASQUETTI  2,749,571
MACHINE FOR MIXING AND EXTRUDING
Filed Jan. 18, 1952  6 Sheets-Sheet 6
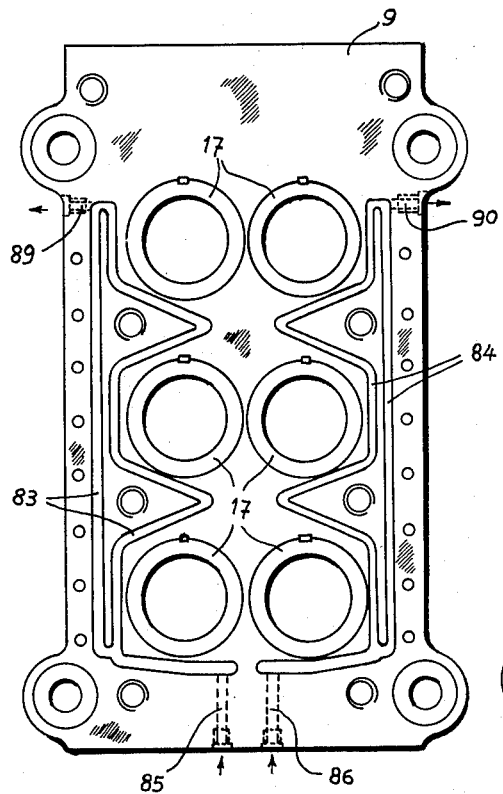
Fig. 8
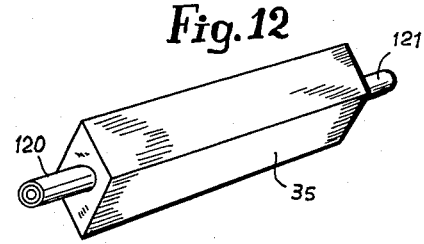
Fig. 12
Fig. 9
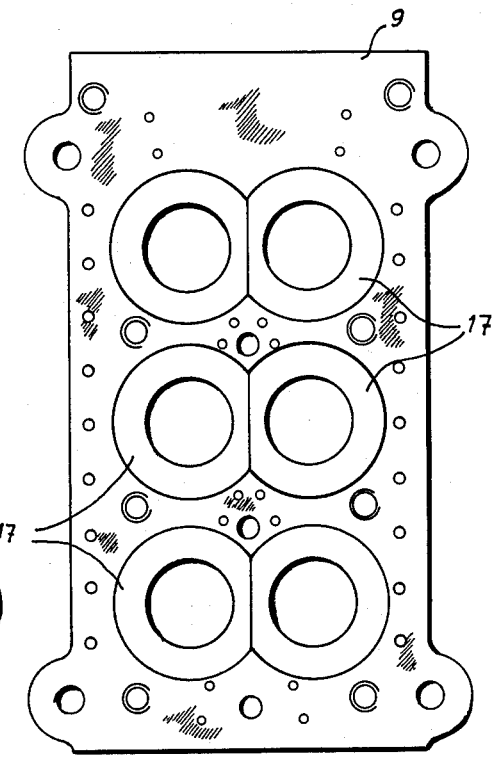
Fig. 13
INVENTOR
CARLO PASQUETTI
BY
ATTORNEY United States Patent Office 2,749,571
Patented June 12, 1956

2,749,571
MACHINE FOR MIXING AND EXTRUDING
Carlo Pasquetti, Varese, Italy Application January 18, 1952, Serial No. 267,133

Claims priority, application Italy June 23, 1951

3 Claims. (Cl. 18—12)

This invention relates to machines for mixing and extruding, and more particularly, but not exclusively, to machines for mixing and extruding thermoplastic synthetic resins for manufacturing thermoplastic powders, granules, tubes, shapes and the like.

A first object of this invention is to provide a machine of the type referred to above which is apt to compress the material being processed, not only, but also to thoroughly mix it, while the latter operation could up till now only be performed in a machine separate from the extrusion press.

A further object of this invention is to provide a machine of the type referred to above, in which the path of the material in the operating region is very much extended with respect to the overall size of said operating region of the machine and the highest possible mixing coefficient is obtained.

A further object of this invention is to provide means mechanically accompanying the material to the point nearest its compressing region.

A further object of this invention is to provide means for adjusting and stabilizing the pressure within the operating region of the machine.

A further object of this invention is to provide a machine of the type referred to above, in which the material is conveyed through the operating region through restricted passages, in order to uniformly and rapidly heat or cool the whole mass processed within the machine.

A further object of this invention is to provide in a machine of the type referred to means for hand or automatic adjustment of the temperature of the material in the operating region, in order to constantly maintain said material under optimum temperature conditions, independently of the considerable heat generated by internal friction during mixing of the mass having a high viscosity coefficient.

These and further objects of this invention will appear from the appended description, reference being had to the accompanying drawings, wherein:

Figure 7 is a perspective view of the side walls of the head;

Figure 8 is a plan view of the front surface of a cross member of the head;

Figure 9 is a plan view of the inner surface of said cross member;

Figure 10 is a longitudinal section of a detail of a modified construction;

Figure 11 is a cross section of conduits taken at the extrusion opening;

Figure 12 is a perspective view of the lower divider;

Figure 13 is a section taken on line XIII—XIII of Figure 12.

Figures 1, 2:
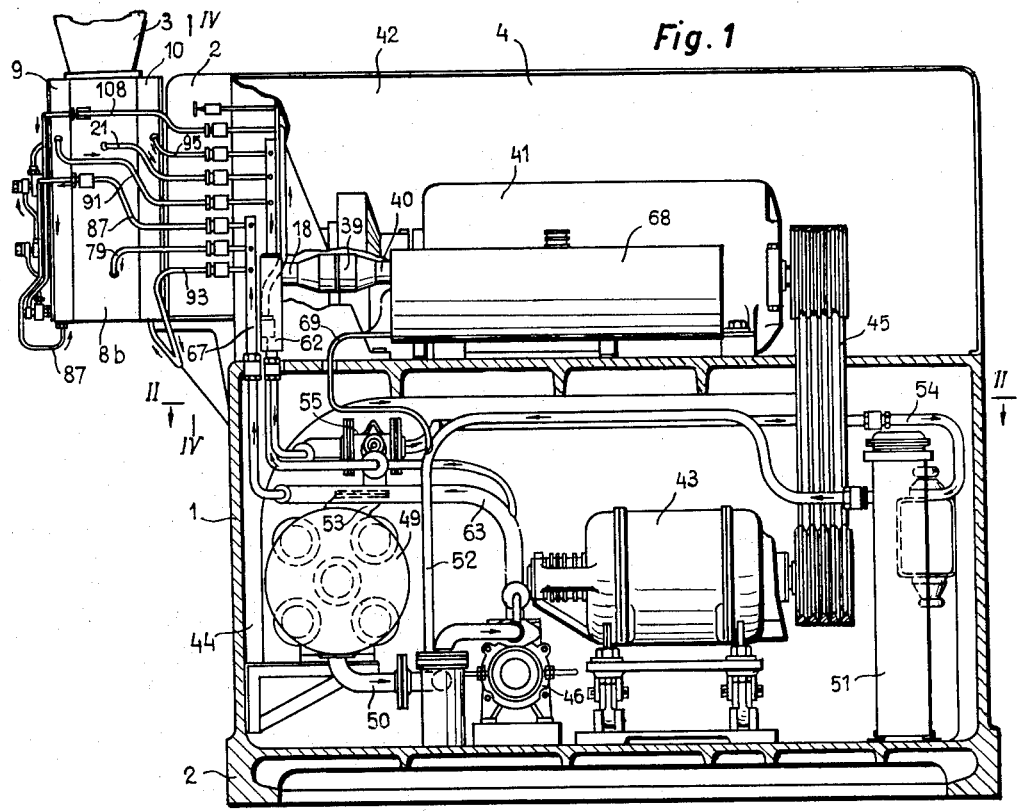
Figure 1 is a part longitudinal section of the machine.
Figure 2 is a section along the line II—II of Figure 1.
Figure 3:
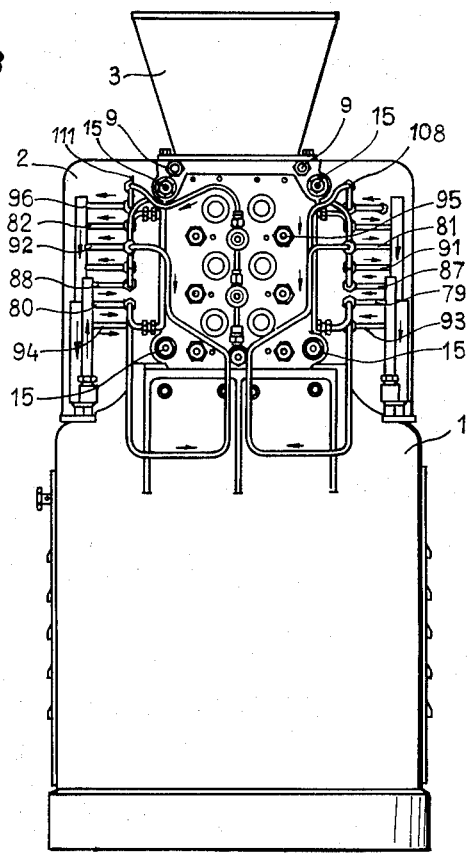
Figure 3 is a front section of the machine from the head side.

Referring to the drawing, 1 denotes the machine frame which is provided with a front support 2 symmetrically arranged with respect to the longitudinal middle plane of the machine. The front support has attached thereto a head in the form of a casing enclosing the members performing mixing, kneading and compression of the processed material.

The material reaches the inside of the head through a hopper 3 secured to the upper head end, and is conveyed towards three superposed pairs of intermeshing bi-helical toothed wheels $4a$, $4b$, $5a$, $5b$, and $6a$, $6b$, respectively (Figure 6) which mix and compress the material conveying it downwardly towards an extrusion opening 7 situated at the bottom of the head hollow.

Figure 5:
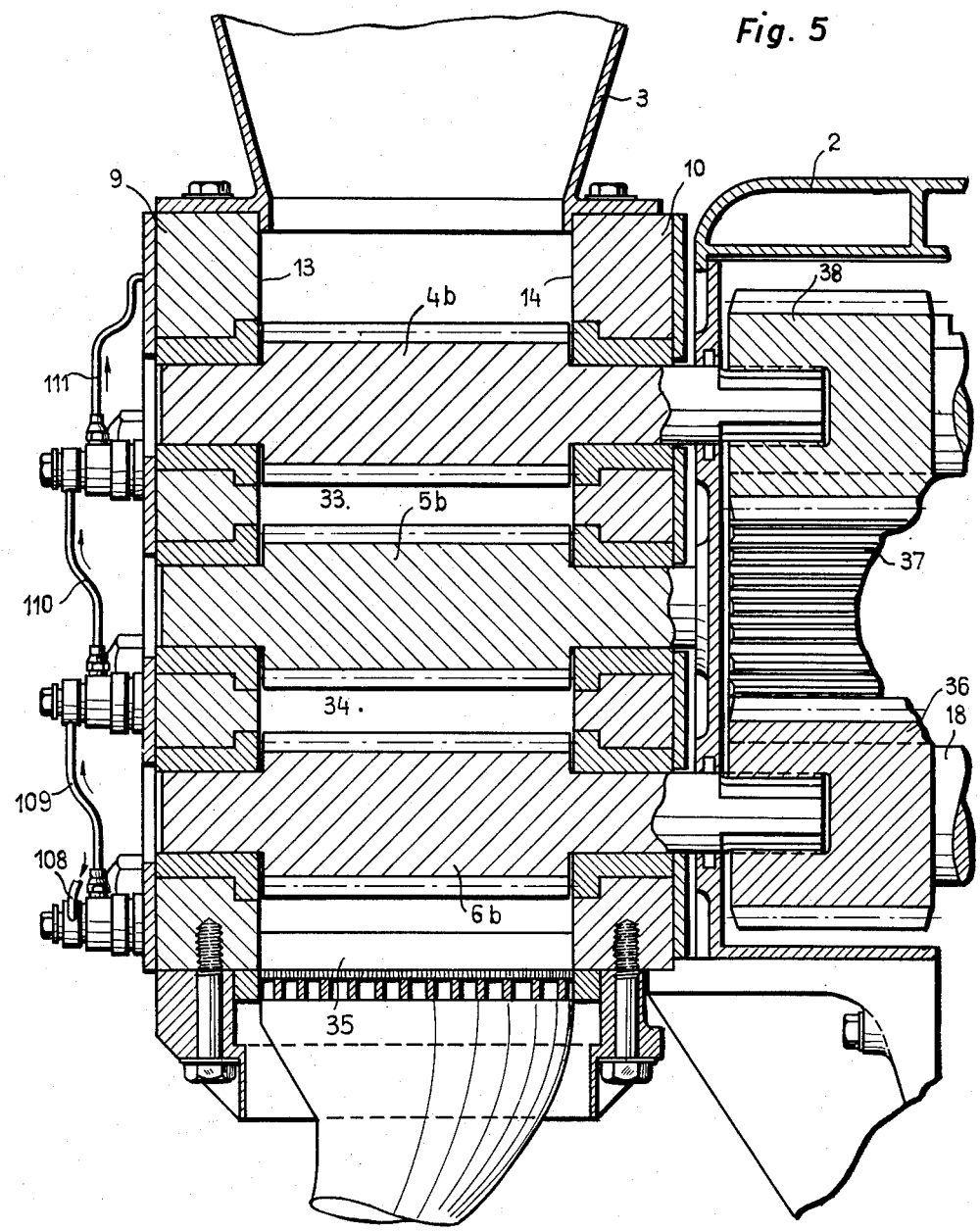
Figure 5 is a longitudinal section on an enlarged scale of the head.

The head hollow is laterally confined by two vertical lateral walls $8a$, $8b$ (Figures 6 and 7) symmetrically arranged with respect to the longitudinal middle plane of the machine forming the side walls of the head and interposed between two front and rear cross plates 9, 10, respectively (Figures 1, 2, 3, 8 and 9) perpendicular to the side walls $8a$, $8b$ and forming the front and rear head walls, respectively. The side walls $8a$, $8b$ and plates 9 and 10 are connected together by means of bolts 11 extending through concentric grooves cut in the cross plates and side walls, thereby forming an inner chamber 12 (Figure 6) in the head, confined in a longitudinal direction of the machine by the vertical inner surfaces 13, 14 (Figure 5) of the cross plates 9, 10, and laterally confined by the inner surfaces of the side walls $8a$, $8b$.

15 (Figure 3) denotes four rods anchored at their ends to the front support and reaching within their respective seats formed by coaxial sections in the plates 9, 10 and side walls $9a$, $9b$, respectively, at four longitudinal edges of the head. The rods are provided at their free ends with screw-threaded nuts securing the head to the front support 2.

Each of the intermeshing toothed wheels belonging to three superposed pairs $4a$, $4b$, $5a$, $5b$ and $6a$, $6b$ is provided with lateral pins rotatably mounted in bearings 17 (Figure 5) fitted in the cross plates 9, 10.

The width of each wheel substantially equals the spacing between the vertical inner surfaces 13, 14 of the walls 9, 10.

Figure 6:
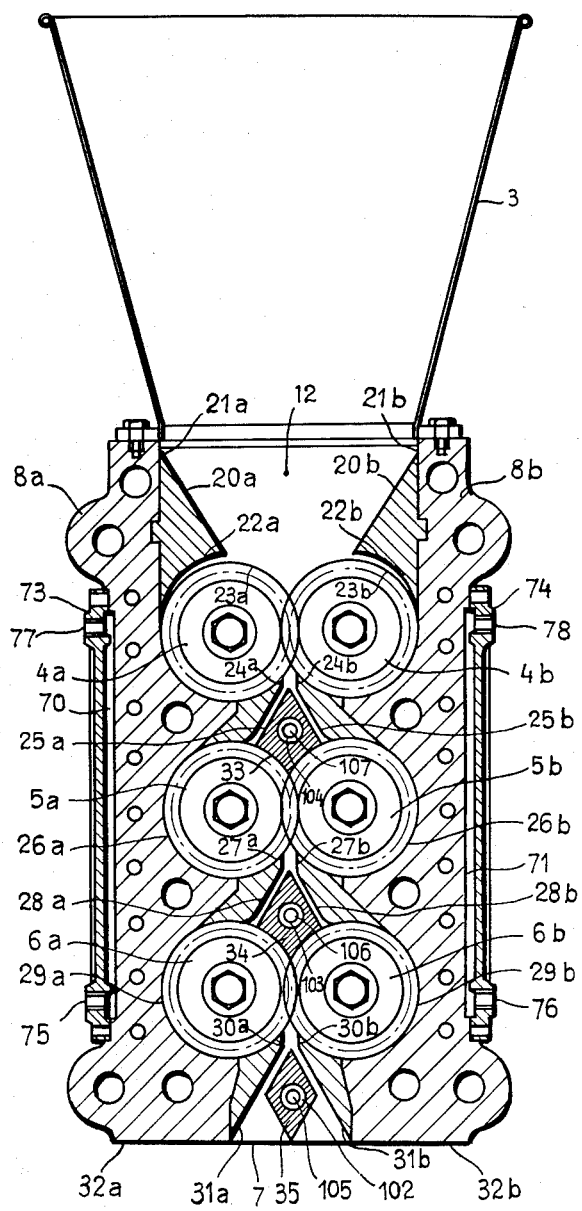
Figure 6 is an enlarged cross section of the head on line V—V of Figure 2.

Each inner surface of the side walls $8a$, $8b$ is formed with sections $20a$, $20b$, respectively, Figure 6, inclined towards the intermeshing region of the toothed wheels $4a$, $4b$ of the upper pair. These sections merge at their upper end into the side walls of the hopper by means of short vertical sections $21a$, $21b$ and at their lower end into curvilinear sections $22a$, $22b$, respectively of such form that the spaces between the surface of said sections and the surface of their respective head cylinder of the teeth of the wheels $4a$, $4b$ gradually decrease in section to zero at the diametrical horizontal plane of the wheels $4a$, $4b$. The sections $22a$, $22b$ are followed by sections $23a$, $23b$ substantially following the periphery of the head cylinders of the teeth of the wheels $4a$, $4b$ and end near their intermeshing region beneath the latter, merging into short vertical sections $24a$, $24b$ followed by diverging inclined sections $25a$, $25b$, respectively, substantially directed towards the top of the toothed wheels $5a$, $5b$ pertaining to the intermediate pair and connected in turn by sections $26a$, $26b$ substantially following the head cylinders of the teeth of the wheels $5a$, $5b$ and ending just below the intermeshing region of the latter wheels, whereupon they merge into short vertical sections 27a, 27b similar to the sections 24a, 24b and are followed by inclined diverging sections 28a, 28b towards the top of the toothed wheels 6a, 6b pertaining to the lower pair and merging into curved sections 29a, 29b, respectively, substantially following the head cylinder of the teeth of the wheels 6a, 6b to their intermeshing region, where they merge into short vertical sections 30a, 30b and successive diverging inclined sections 31a, 31b ending at the lower walls 32a, 32b of the side walls 8a, 8b and forming side walls of the extrusion conduit. The inner space of the head further encloses, below the intermeshing regions of each of the three pairs of toothed wheels, three dividers 33, 34 and 35, respectively, parallel with the wheels extending throughout the spacing between the plates 9 and 10 and secured to the latter by means of pins 130, 131 (Fig. 12) provided by pairs at the end of each divider and reaching within suitable seatings formed in the surfaces 13 and 14 of the plates 9, 10.

Each divider is formed with two upper walls, which are inclined and diverge downwardly, forming an upper edge situated in the longitudinal middle plane of the machine. The inclined walls of the dividers 33 and 34 merge into two lower walls substantially following the surfaces of the head cylinders of the teeth of the wheels of the pairs 4a, 4b, 5a, 5b, respectively cutting each other at the intermeshing region of said wheels. The lower walls of the divider 35 situated beneath the pair of toothed wheels 6a, 6b are flat and converge to form with the upper walls, seen in section, a rhombus, of which the lower edge is at the level of the walls 32a, 32b. With this arrangement, the processed material follows the peripheries of the toothed wheels along an arc not smaller than 220° and all the conduits are strongly flattened in section, thereby improving mixing and heat exchange between the walls and the processed material. The inclination of each of said upper walls of the dividers 33, 34, 35 equals the inclination of the associated adjacent sections of the inner surfaces of the sidewalls 8a, 8b, more particularly the sections 25a and 25b, 28a and 28b, 31a and 31b.

The edge formed by said upper walls of the dividers is substantially at the level of the beginning of the above-described inclined sections pertaining to the inner surface of the side walls 8a and 8b. The inclination of the upper walls of the dividers 33, 34, 35 may be conveniently smaller than the inclination of the associated adjacent sections of the above mentioned inner surfaces of the side walls 8a, 8b, to form downwardly converging conduits.

Alternatively, the inner surfaces of each side wall 8a, 8b may be formed with vertical sections tangential to the head cylinders of the teeth of toothed wheels of the upper pair at their horizontal diametrical plane, merging into sections substantially following the peripheries of the head cylinders of said wheels till they become substantially horizontal and merging in turn into two flat diverging sections, tangential to the peripheries of the head cylinders of the teeth of the wheels of the intermediate pair, merging into sections following the head cylinders of the teeeth of wheels of said intermediate pair, till they become substantially horizontal, and merging in turn into inclined flat surfaces, which diverge and are tangential to the peripheries of the head cylinders of the teeth of the wheels of the lowermost pair and merging into a section which substantially follows the periphery of the head cylinders of the teeth of the wheels of said lowermost pair merging into substantially vertical sections which end at the lower head end. The head hollow further encloses separately attached members intended to extend the external shroud of the toothed wheels to the intermeshing region of each pair, thereby extending them along an arc of at least 220° and to restrict the free internal passages.

Said members equal in length the spacing between the cross plates 9 and 10 to which they are secured by means of pins 16 (Fig. 7) engaged by associated seatings in the inner surfaces of said plates.

The toothed wheels 4a, 4b, 5a, 5b and 6a, 6b pertaining to the three superposed pairs are formed with bi-helical teeth which, as is well known, advantageously reduce instantaneous compression stresses.

The toothed wheels of each pair rotate in such manner that the speed vector of their intermeshing region is directed towards the charging hopper.

Figure 4:
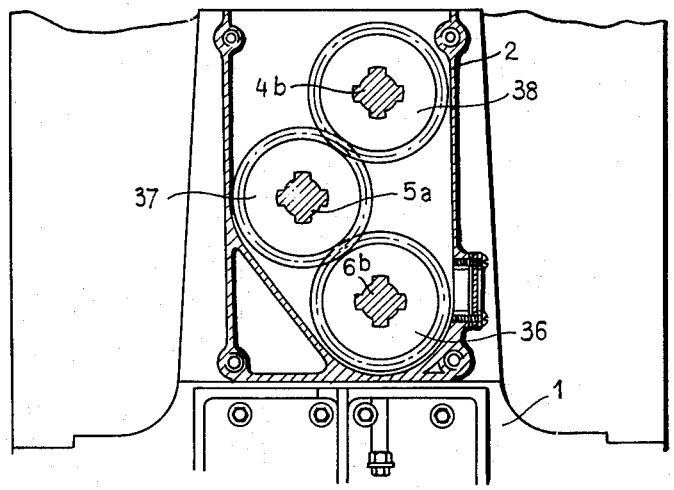
Figure 4 is a cross section on an enlarged scale on line IV—IV of Figure 1.

Movement is transmitted to the wheels of the three pairs by three intermeshing toothed wheels 36, 37, 38 (Figures 4 and 5), rotatably secured within the front support 2 of the machine and coaxial with the wheels 6b, 5a and 4b, respectively, of which the rear lateral pins extend towards the front support 2 and are formed with splined profiles engaged by associated splined holes in the wheels. The pivot 18 of the wheel 36 is connected by means of a joint 39 (Figure 1) to the shaft 40 of the change speed gear 41 situated in the upper compartment 42 of the machine and receiving motion from the motor 43 situated in the lower compartment 44 of the machine frame through the interposition of a belt drive 45.

The bi-helical teeth of the wheels 4a, 4b, 5a, 5b and 6a, 6b are of cycloidal profile.

These teeth may conveniently be such that their profiles are made up of curved sections merging into one another without forming sharp edges. Of course, in this case all the wheels should be driven from the outside and transmission of movement between the change speed gear 41 and wheels should be conveniently modified.

The teeth of the profile described above advantageously facilitate expelling of the material contained between the teeth in the tooth intermeshing region.

The machine operates as follows:

The material to be processed filled into the hopper runs downwardly along the inclined flat sections 20a, 20b towards the middle plane of the head, where it is carried along by the teeth of the wheels 4a, 4b towards the inner walls of the side walls 8a, 8b, where it collects between the teeth of the wheels 4a and 4b and is carried along over the sections 23a, 23b to the intermeshing region of the teeth of said wheels. After it has undergone the first compression, mixing and kneading step it is expelled downwardly under the action of the intermeshing teeth and reaches through two diverging lateral conduits, confined by the sections 25a, 25b, respectively and upper surfaces of the divider 33, the periphery of the wheels 5a, 5b. These toothed wheels are conveniently smaller in diametral pitch. Consequently, their teeth are lower than the teeth of the wheels 4a, 4b, whereby a higher pressure is exerted on the material which, by effect of the compression by the wheels 4a, 4b has acquired a smaller volume and a higher density. The material collected by the teeth of the wheels 5a, 5b flows along the sections 26a, 26b to the intermeshing regeion of said wheels where it is further compressed, mixed, kneaded and is discharged towards the divider 34, reaching the periphery of the toothed wheels 6a, 6b through two diverging conduits laterally confined by the sections 28a, 28b of the side walls and upper surfaces of the divider 34.

The wheels 6a, 6b are of a further reduced diametral pitch, their teeth height is consequently further reduced.

These toothed wheels convey the material over the sections 29a, 29b of the inner surfaces of the side walls and, upon further compressing and mixing it at their intermeshing region convey said material to the extrusion opening through conduits which are laterally confined by section 31a, 31b, respectively and the walls of the divider 35.

During operation, the machine may feed outer extrusion dies of various size, opposing a variable resistance to extrusion in accordance with their respective features. Accordingly, variable pressures are established in each case in the machine, also in order to improve rolling of the material.

It is therefore necessary to adjust the pressure of the material within the machine independently of the features of the extrusion dies employed, predetermined hourly output and properties of the material, in order to afford uniform processing in each case.

This purpose is attained by proper arrangement of the divider 35, of which the axis may be displaced in a vertical plane, which makes possible a variation in section of the diverging conduits laterally confined by the upper walls of the divider 35 and inclined sections 31a, 31b of the inner surfaces of the side walls 8a, 8b, respectively. In Figures 10 and 13, the divider 35' which is intended to break the jet of the processed material moving towards the extrusion opening, is provided with two lateral tubular projections 120 and 121 which rest on two supports 122, 123 sliding in the vertical guides 124, 125 formed at the lower ends of the plates 9', 10'. By acting on the screws 126, 127 the divider 35' may be displaced in a vertical plane, thereby enlarging or restricting at will the section of the conduits 128, 129 (Fig. 11).

In order to adjust the temperature of the processed material flowing through the operating region of the head and undergoing mixing, kneading and compression, the machine is provided with heat exchanging means actuated by hand or automatically through suitable relays responding to the variations in temperature occurring during processing within the head.

Said means substantially consist of a heat exchanger fluid circuit situated in the machine head and connected by suitable pipes with an adjusting circuit within the frame.

More particularly, the circuit in the lower compartment 44 (Figures 1 and 2) of the frame includes a pump 46 actuated by a motor 47 connected at its inlet with a filter 48, a fluid heater 49, such as an electrically heated boiler, connected at its outlet with the inlet of the filter 48 through a conduit 50, and a cooling device 51, such as a water-cooled heat exchanger. 52 denotes a conduit connecting the outlet of the cooling device 51 with the inlet of the filter 48. 53 and 54 denote conduits connecting the inlets of the heating and cooling device 49, 51, respectively for the fluid to a switch-over valve 55 actuated from the outside by an operating lever 56 through the interposition of the rod 57.

The inlet of the valve 55 is connected with a cross conduit 58 communicating through lateral connections 59 and 60 with two return manifolds 61, 62 arranged on both sides of the upper compartment of the machine frame.

The pump outlet is connected by means of the conduit 63 and lateral connections 64, 65 with lateral supply manifolds 66, 67 in the top compartment in proximity of the inlet manifolds 61, 62, respectively. A feed reservoir 68 in the top compartment of the machine feeds fluid to the circuit over a conduit 69.

Moreover, the suction and supply pipes of the pumps are connected together by means of the tube 63a provided with a by-pass valve. It is thus possible to gradually vary the effective delivery pump in order to adjust heating and cooling to the desired degree.

Each side wall is formed with a chamber for cycling the heat exchanger fluid, formed in the outer lateral surfaces of said side walls. These chambers are tightly closed from the outside by covers each provided with an inlet and an outlet opening. In Figures 6 and 7, 70, 71 denote the chambers in the side walls 8a, 8b. 73, 74 denote the sealing covers secured to the side wall by a set of screws. 75, 76 denote the inlet openings, 77, 78 the outlet openings, 79 and 80 (Figures 1 and 3) denote the connecting pipes connecting the inlet openings in the chambers 70, 71 bored in the side walls 8a, 8b to supply manifolds 66, 67, respectively. 81, 82 denote connecting pipes connecting the outlet openings of said chambers with return manifolds 61, 62, respectively. The plates 9 and 10 are each formed with grooves cut in their outer surface. Figure 8 shows in plan one of said plates. 83, 84 denote the grooves symmetrically cut in the two sides of the plate. 85, 86 denote inlet channels connected by external connecting tubes 87, 88 (Figures 1 and 3) with pressure manifolds 66, 67. 89, 90 (Figure 2) denote outlet channels connected by external connecting pipes 91, 92 (Figures 1 and 3) with return manifolds 61, 62, respectively.

93, 94 denote connecting pipes connecting supply manifolds 66, 67, respectively with the inlets of the grooves for fluid circulation, provided in the plate 10; 95 and 96 denote the connecting tubes connecting the outlets from said grooves with return manifolds 61, 62, respectively.

97, 98 (Figures 1, 2 and 5) denote covers tightly closing from the outside the above mentioned grooves.

Each divider 33, 34 and 35 is formed with longitudinal bores in which internal tubular members 99, 100, 101 are separately attached, which are coaxial with said bores and further serve for anchoring the dividers to the plates 9 and 10 and confine internally of the dividers annular conduits 104, 103 and 102 and inner conduits 107, 106 and 105, respectively. Each annular conduit connects at the cross plate 10 with its associated internal conduit. 108 (Figure 5) denotes the the connecting pipe interposed between the end of the conduit 105 (Figure 6) on the side of the plate 9 and supply pipe 106 connected in turn with the supply conduit 63 of the pump 41 (Figures 1 and 2). 109, 110 (Figure 5) denote connecting pipes interposed between the ends on the side of the plate 9 of the conduits 102, 106, 103 and 107 (Figure 6). 111 (Figures 1 and 5) denotes the connecting conduit connecting the conduit 104 (Figure 6) with the return manifold 61 (Figure 2).

What I claim is:

1. A machine for mixing and kneading material in a plastic condition either hot or cold and extruding the same under pressure, said machine comprising a casing having a feed inlet and a pressure extrusion outlet, a series of gear pumps within said casing, each of said gear pumps having an inlet and an outlet, conduit means connecting the inlet of the first gear pump of the series to the feed inlet of the casing, conduit means connecting the outlet of each gear pump except the last one to the inlet of the next succeeding gear pump, conduit means connecting the outlet of the last gear pump to the pressure extrusion outlet of the casing, a divider in the conduit means extending from the outlet of each gear pump, the divider following the last gear pump being provided with mounting means for selective adjustment of the divider to vary its restriction of the conduit means in which it is disposed, means to actuate said gear pumps concurrently, and means for selectively regulating the temperature of the material as it passes through the gear pumps.

2. A machine for mixing and kneading material in a plastic condition either hot or cold and extruding the same under pressure, said machine comprising a casing having a feed inlet and a pressure extrusion outlet, a series of gear pumps within said casing, each of said gear pumps having an inlet and an outlet, conduit means connecting the inlet of the first gear pump of the series to the feed inlet of the casing, conduit means connecting the outlet of each gear pump except the last one to the inlet of the next succeeding gear pump, conduit means connecting the outlet of the last gear pump to the pressure extrusion outlet of the casing, the volumetric capacity of successive gear pumps being progressively smaller, a divider in the conduit means extending from the outlet of each gear pump, the divider following the last gear pump being provided with mounting means for selective adjustment of the divider to vary its restriction of the conduit in which it is disposed, means to actuate said gear pumps concurrently, and means for selectively regulating the temperature of the material as it passes through the gear pumps.

3. A machine for mixing and kneading material in a plastic condition either hot or cold and extruding the same under pressure, said machine comprising a casing having a feed inlet and a pressure extrusion outlet, a series of gear pumps within said casing, each of said gear pumps having an inlet and an outlet, conduit means connecting the inlet of the first gear pump of the series to the feed inlet of the casing, conduit means connecting the outlet of each gear pump except the last one to the inlet of the next succeeding gear pump, conduit means connecting the outlet of the last gear pump to the pressure extrusion outlet of the casing, a divider in the conduit means extending from the outlet of the last gear pump, said divider being provided with mounting means for selective adjustment of the divider to vary its restriction of the conduit means in which it is disposed, means to actuate said gear pumps concurrently, and means for selectively regulating the temperature of the material as it passes through the gear pumps.

References Cited in the file of this patent

UNITED STATES PATENTS

| | | |
|---|---|---|
| 418,045 | Mitchell | Dec. 24, 1889 |
| 1,214,300 | Grouvelle et al. | Jan. 30, 1917 |
| 1,302,484 | Stratton et al. | Apr. 29, 1919 |
| 1,681,566 | Anderegg | Aug. 21, 1928 |
| 1,923,268 | Jensen | Aug. 22, 1933 |
| 2,015,618 | Cooke | Sept. 24, 1935 |
| 2,215,976 | Robinson | Sept. 24, 1940 |
| 2,691,482 | Ungar | Oct. 12, 1954 |

FOREIGN PATENTS

| | | |
|---|---|---|
| 17,145 | Great Britain | 1896 |
| 562,017 | France | Aug. 23, 1923 |
| 641,685 | Germany | Feb. 10, 1937 |